United States Patent
Ashparie et al.

(10) Patent No.: US 10,210,156 B2
(45) Date of Patent: Feb. 19, 2019

(54) SEED SELECTION IN CORPORA COMPACTION FOR NATURAL LANGUAGE PROCESSING

(71) Applicant: International Business Machines Corporation, Armonk, NY (US)

(72) Inventors: Yousuf M. Ashparie, Centerville, VA (US); Aaron K. Baughman, Silver Spring, MD (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 920 days.

(21) Appl. No.: 14/151,997

(22) Filed: Jan. 10, 2014

(65) Prior Publication Data

US 2015/0199417 A1   Jul. 16, 2015

(51) Int. Cl.
   *G06F 17/30*  (2006.01)
   *G06F 17/27*  (2006.01)
(52) U.S. Cl.
   CPC ...... *G06F 17/2785* (2013.01); *G06F 17/3071* (2013.01); *G06F 17/30734* (2013.01)
(58) Field of Classification Search
   None
   See application file for complete search history.

(56) References Cited

U.S. PATENT DOCUMENTS

| | | | | |
|---|---|---|---|---|
| 5,787,420 A | * | 7/1998 | Tukey | G06F 17/3071 |
| 6,658,151 B2 | | 12/2003 | Lee et al. | |
| 7,395,256 B2 | * | 7/2008 | Ji | G06F 17/3071 |
| | | | | 707/737 |
| 7,454,341 B1 | * | 11/2008 | Pan | G06K 9/6223 |
| | | | | 704/231 |
| 7,610,313 B2 | * | 10/2009 | Kawai | G06F 17/30705 |
| 7,657,507 B2 | | 2/2010 | Shi et al. | |

(Continued)

FOREIGN PATENT DOCUMENTS

| EP | 2045739 A2 | 8/2009 |
|---|---|---|
| WO | 2007055986 A3 | 9/2008 |
| WO | 2012050800 A1 | 4/2012 |

OTHER PUBLICATIONS

Siemans et al; Technology of Ontology Clustering of Effective Reasoning Procedures, Jun. 10, 2010.

(Continued)

*Primary Examiner* — Jeff A Burke
(74) *Attorney, Agent, or Firm* — Garg Law Firm, PLLC; Rakesh Garg; Christopher K. McLane

(57) ABSTRACT

A method, system, and computer program product for seed selection in corpora compaction for natural language processing are provided in the illustrative embodiments. A set of initial clusters is formed from a set of documents in a corpus for natural language processing, wherein a subset of documents belong to an initial cluster in the set of initial cluster. A subset of the initial clusters is merged to form a merged cluster. A set of keywords that is representative of the merged cluster is identified. An epicenter of the merged cluster is formed using the set of keywords, the epicenter forming a seed. A document that is a member of the merged cluster is ranked according to a relationship of a taxonomy of the document and the epicenter.

20 Claims, 6 Drawing Sheets

(56) References Cited

U.S. PATENT DOCUMENTS

| | | | |
|---|---|---|---|
| 7,702,680 B2 * | 4/2010 | Yih | G06F 17/30719 |
| | | | 707/738 |
| 7,999,704 B2 | 8/2011 | Fitzek et al. | |
| 8,024,332 B2 * | 9/2011 | Cao | G06F 17/30696 |
| | | | 707/728 |
| 8,073,838 B2 | 12/2011 | Shi et al. | |
| 8,583,648 B1 * | 11/2013 | Majkowska | G06F 17/30011 |
| | | | 707/737 |
| 8,977,540 B2 * | 3/2015 | Yasin | G06F 17/30719 |
| | | | 704/1 |
| 9,177,050 B2 * | 11/2015 | Lu | G06F 17/30722 |
| 9,189,540 B2 * | 11/2015 | Hailpern | G06F 17/30705 |
| 9,268,844 B1 * | 2/2016 | Kadarkarai | G06F 17/30705 |
| 9,299,024 B2 * | 3/2016 | Bagchi | G06N 5/02 |
| 2006/0235870 A1 * | 10/2006 | Musgrove | G06F 17/30734 |
| 2006/0242098 A1 * | 10/2006 | Wnek | G06F 17/30634 |
| | | | 706/45 |
| 2006/0242140 A1 * | 10/2006 | Wnek | G06K 9/622 |
| 2006/0242190 A1 * | 10/2006 | Wnek | G06F 17/30734 |
| 2007/0112898 A1 * | 5/2007 | Evans | G06F 17/30705 |
| 2007/0203863 A1 * | 8/2007 | Gupta | G06N 99/005 |
| | | | 706/20 |
| 2009/0216692 A1 * | 8/2009 | Saito | G06F 17/30743 |
| | | | 706/12 |
| 2010/0169441 A1 | 7/2010 | Lafleur et al. | |
| 2010/0239139 A1 * | 9/2010 | Hunt | H01J 49/0036 |
| | | | 382/128 |
| 2011/0138312 A1 | 6/2011 | Zei-Chan et al. | |
| 2011/0231395 A1 * | 9/2011 | Vadlamani | G06F 17/30654 |
| | | | 707/723 |
| 2012/0077178 A1 * | 3/2012 | Bagchi | G09B 7/00 |
| | | | 434/362 |
| 2012/0078636 A1 * | 3/2012 | Ferrucci | G06F 17/30654 |
| | | | 704/270.1 |
| 2012/0078889 A1 * | 3/2012 | Chu-Carroll | G06F 17/30654 |
| | | | 707/723 |
| 2012/0078895 A1 * | 3/2012 | Chu-Carroll | G06F 17/30637 |
| | | | 707/728 |
| 2012/0130995 A1 | 5/2012 | Risvik et al. | |
| 2012/0084076 A1 | 8/2012 | Boguraev et al. | |
| 2012/0254188 A1 * | 10/2012 | Koperski | G06F 17/30663 |
| | | | 707/740 |
| 2012/0296637 A1 | 11/2012 | Smily et al. | |
| 2013/0103625 A1 | 4/2013 | Tateno et al. | |
| 2013/0212092 A1 | 8/2013 | Dean et al. | |
| 2013/0325863 A1 * | 12/2013 | Jin | G06Q 30/04 |
| | | | 707/737 |
| 2015/0066939 A1 * | 3/2015 | Misra | G06F 17/3071 |
| | | | 707/739 |
| 2015/0193682 A1 * | 7/2015 | Baughman | G06N 99/005 |
| | | | 707/728 |

OTHER PUBLICATIONS

Anonymous, System and Method for Using Hypernym Trees to Enable Concept and Topic Based Searches, Dec. 18, 2012.

Pipitone et al; Cognitive Linguistics as the Underlying Framework for Semantic Annotation, 2012.

Caverlee et al; Distributed Query Sampling: A Quality-Conscious Approach, Aug. 6-10, 2006, Seattle, Washington, USA.

Chowdhury et al; Logarithmic Formula Generated Seed Based Cryptographic Technique Using Proposed Alphanumeric Number System and Rubik Rotation Algorithm, 2012.

Gao et al; Corpus Expansion for Statistical Machine Translation with Semantic Role Label Substitution Rules, Proceedings of the 49th Annual Meeting of the Association for Computational Linguistics: shortpapers, pp. 294-298, Portland, Oregon, Jun. 19-24, 2011.

Gey et al; The Crucial Role of Semantic Discovery and Markup in Geo-temporal Search, ESAIR'10, Oct. 30, 2010, Toronto, Ontario, Canada.

Gharechophogh et al; Analysis and Evaluation of Unstructured Data: Text Mining versus Natural Language, 2011.

Li et al; Scalable Community Discovery on Textual Data with Relations, CIKM'08, Oct. 26-30, 2008, Napa Valley, California, USA.

Park et al; Anaphora Resolution System for Natural Language Requirements Document in Korean, 2010 Third International Conference on Information and Computing, 2010.

Rao et al; Affinity Measures based on the Graph Laplacian, Coling 2008: Proceedings of 3rd Textgraphs workshop on Graph-Based Algorithms in Natural Language Processing, pp. 41-48, Manchester, Aug. 2008.

Schlaefer, Statistical Source Expansion for Question Answering, 2009-2011.

Tianqiang et al; A robust video text extraction method based on text traversing line and stroke connectivity, 2008.

Liu et al; Using WordNet to Disambiguate Word Senses for Text Classification, ICCS 2007, Part III, LNCS 4489, pp. 780-788, 2007. Springer-Verlag Berlin Heidelberg 2007.

Yuan et al; Natural Language Processing Based Ontology Learning, 2010 International Conference on Computer Application and System Modeling (ICCASM 2010), 2010.

Joaqu' In Adiego, et al., "A Two-Level Structure for Compressing Aligned Bitexts", Spanish projects TIN2006-15071-C03-01.

* cited by examiner

SEED SELECTION IN CORPORA COMPACTION FOR NATURAL LANGUAGE PROCESSING

GOVERNMENT RIGHTS

This invention was made with Government support. The GOVERNMENT HAS CERTAIN RIGHTS IN THIS INVENTION.

TECHNICAL FIELD

The present invention relates generally to a method, system, and computer program product for improving natural language processing. More particularly, the present invention relates to a method, system, and computer program product for seed selection in corpora compaction for natural language processing.

BACKGROUND

Natural language processing (NLP) is a technique that facilitates exchange of information between humans and data processing systems. For example, one branch of NLP pertains to answering questions about a subject matter based on information available about the subject matter domain.

Information about a domain can take many forms and can be sourced from any number of data sources. The presenter of the information generally selects the form and content of the information. Before information can be used for NLP, generally, the information has to be transformed into a form that is usable by an NLP engine.

SUMMARY

The illustrative embodiments provide a method, system, and computer program product for seed selection in corpora compaction for natural language processing. An embodiment An embodiment includes a method for seed selection in corpora compaction for natural language processing. The embodiment forms, using a processor, a set of initial clusters from a set of documents in a corpus for natural language processing, wherein a subset of documents belong to an initial cluster in the set of initial clusters. The embodiment merges a subset of the initial clusters to form a merged cluster. The embodiment identifies a set of keywords that is representative of the merged cluster. The embodiment forms an epicenter of the merged cluster using the set of keywords, the epicenter forming a seed. The embodiment ranks a document that is a member of the merged cluster according to a relationship of a taxonomy of the document and the epicenter.

Another embodiment includes a computer program product for seed selection in corpora compaction for natural language processing. The embodiment further includes one or more computer-readable tangible storage devices. The embodiment further includes program instructions, stored on at least one of the one or more storage devices, to form a set of initial clusters from a set of documents in a corpus for natural language processing, wherein a subset of documents belong to an initial cluster in the set of initial clusters. The embodiment further includes program instructions, stored on at least one of the one or more storage devices, to merge a subset of the initial clusters to form a merged cluster. The embodiment further includes program instructions, stored on at least one of the one or more storage devices, to identify a set of keywords that is representative of the merged cluster. The embodiment further includes program instructions, stored on at least one of the one or more storage devices, to form an epicenter of the merged cluster using the set of keywords, the epicenter forming a seed. The embodiment further includes program instructions, stored on at least one of the one or more storage devices, to rank a document that is a member of the merged cluster according to a relationship of a taxonomy of the document and the epicenter.

Another embodiment includes a computer system for seed selection in corpora compaction for natural language processing. The embodiment further includes one or more processors, one or more computer-readable memories and one or more computer-readable tangible storage devices. The embodiment further includes program instructions, stored on at least one of the one or more storage devices for execution by at least one of the one or more processors via at least one of the one or more memories, to form a set of initial clusters from a set of documents in a corpus for natural language processing, wherein a subset of documents belong to an initial cluster in the set of initial clusters. The embodiment further includes program instructions, stored on at least one of the one or more storage devices for execution by at least one of the one or more processors via at least one of the one or more memories, to merge a subset of the initial clusters to form a merged cluster. The embodiment further includes program instructions, stored on at least one of the one or more storage devices for execution by at least one of the one or more processors via at least one of the one or more memories, to identify a set of keywords that is representative of the merged cluster. The embodiment further includes program instructions, stored on at least one of the one or more storage devices for execution by at least one of the one or more processors via at least one of the one or more memories, to form an epicenter of the merged cluster using the set of keywords, the epicenter forming a seed. The embodiment further includes program instructions, stored on at least one of the one or more storage devices for execution by at least one of the one or more processors via at least one of the one or more memories, to rank a document that is a member of the merged cluster according to a relationship of a taxonomy of the document and the epicenter.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
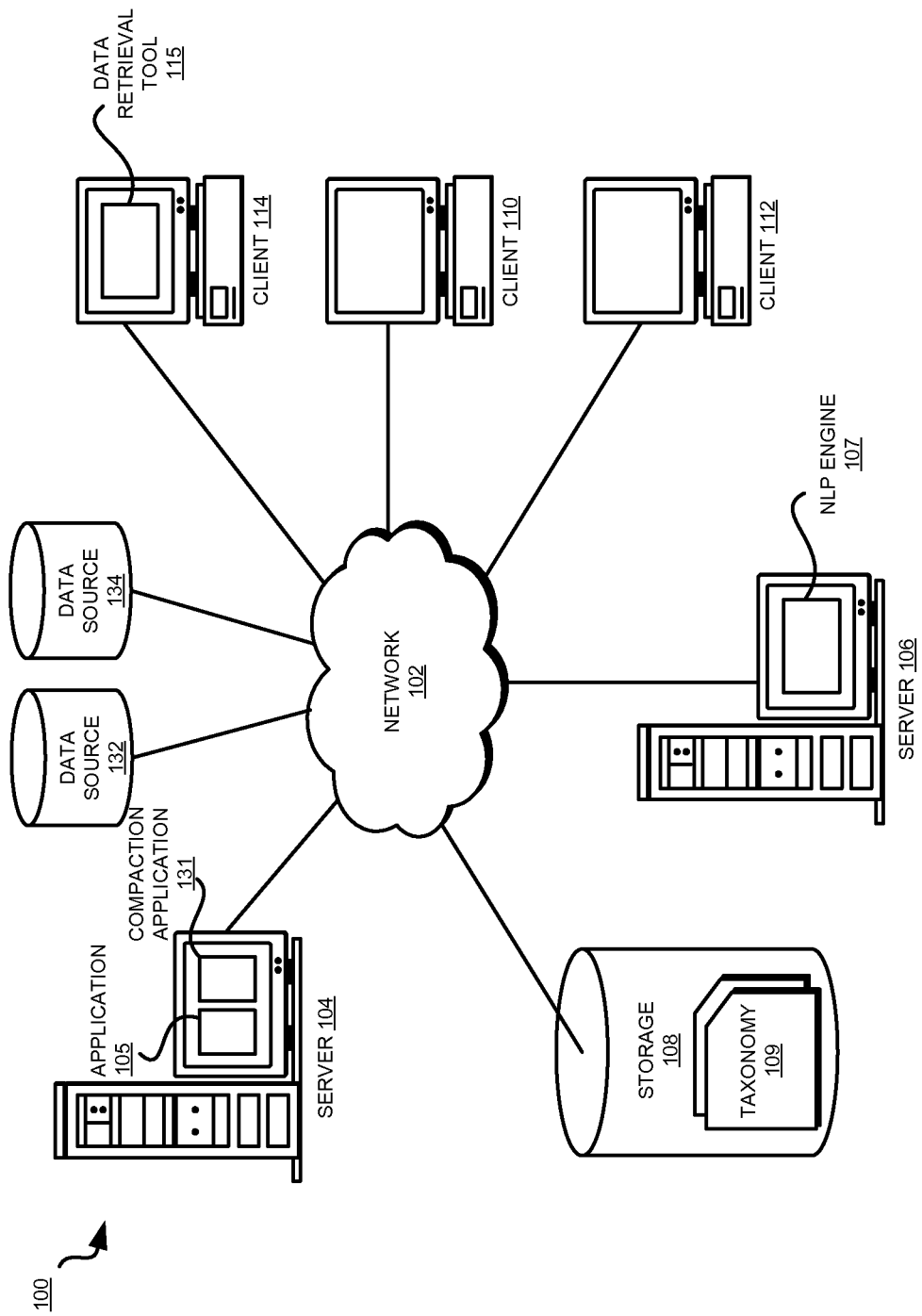
FIG. 1 depicts a block diagram of a network of data processing systems in which illustrative embodiments may be implemented.

A corpus (plural: corpora) is data, or a collection of data, used in linguistics and language processing. A corpus generally comprises large volume of data, usually documents in textual form, stored electronically.

The illustrative embodiments recognize that a data, as originally provided by a data source, is rarely fit for direct consumption by an NLP engine. For example, data received from a source may include acronyms, which may have to be expanded for recognition and consumption in NLP. As another example, words in a document may have to be augmented with the word's synonyms and homonyms, perhaps even antonyms, to produce a transformed document that is usable in NLP. Some other processing of data may be needed to eliminate or reduce the possibilities of failures or errors from a data source. Other processing of data may include manipulating the data for candidate answer generation, and other NLP objectives.

The illustrative embodiments recognize that transforming data to form a corpus or corpora for consumption in an NLP engine often increases the size of the original data. The augmenting, substituting, expanding, duplicating, or otherwise manipulating of data can result in a corpus that is many times the size of the original data, for example, in one case, up to twelve times the size of the original data of a source.

The illustrative embodiments further recognize that the expanded size of the corpus that results from such transformations is problematic. For example, the corpus occupies large storage volumes, slows the processing or consumption of the corpus, and adversely affects standard data retrieval metrics such as the precision, accuracy, and recall.

The illustrative embodiments used to describe the invention generally address and solve the above-described problems and other problems related to the expanded data—corpus, resulting from pre-processing of data for consumption in natural language processing. The illustrative embodiments provide a method, system, and computer program product for seed selection in corpora compaction for natural language processing.

A corpus pertains to a subject matter domain. For example, if an objective of a particular NLP operation were to answer questions related to golf, information collected from various sources would have to be pre-processed to form one or more corpus pertaining to the subject matter domain of golf.

An embodiment constructs one or more language models for a given corpus. In an example process for constructing a language model, in the documents that comprise the corpus, the embodiment extracts and counts those words that describe the corpus, are descriptive of the corpus, or are related to the subject matter of the corpus in some linguistic manner. The embodiment filters out general or common words according to the language of the documents, and words that do not qualify as relating to the subject matter of the corpus. The embodiment constructs a taxonomy of the documents using the extracted and counted words.

An embodiment can be configured to construct the language model in any suitable manner. In other words, an embodiment constructs the language model such that the language model is adaptive to given requirements. For example, construction of one language model, as described above is driven by the desire to construct a taxonomy of some or all documents in the corpus. Another example language model may be configured to mine all words in the corpus, including expanded words, synonyms, and other words introduced into the corpus by a pre-processing operation.

Another example language model may be configured such that the source of the various documents can be scored based on the language models of the documents they each contribute to the corpus. As another example, a language model can be constructed to achieve another subjective or objective purpose.

Furthermore, language models for a corpus are built, refined, or both, over time with changing sets of documents in the corpus. Accordingly, an embodiment can be configured to output one or more adaptive language models for these and other purposes.

A statistical model of a given subject matter domain uses one or more adaptive language models (ALM, ALMs) as input. For example, using one or more adaptive language models, a statistical model determines a level of semantic redundancy and a level of lexical redundancy in a given corpus. Semantic redundancy occurs when the same word or phrase appears again with a different meaning, implication, or context in the corpus as compared to a previous occurrence. Lexical redundancy occurs when the same word is repeated with the same meaning, implication, or context as a previous occurrence.

One embodiment uses singular value decomposition (SVD) process for constructing the ALMs. Essentially, the process of SVD counts the words in a given collection of documents, finds the words that are most important, have similar meanings, words that appear together or within some given distance from one another, words that are similar or dissimilar to one another within the set of documents, and other such properties of the given documents. SVD then summarizes a document in the set based on these findings. The summaries of the documents are also usable for building a language model as described earlier.

A "prior" is a belief or a hypothesis that something is going to happen based on prior knowledge, biases, opinions, thoughts, or information. A prior can be formed as a question or an area of interest. For example, in a question and answer system (Q and A system), a prior can be envisioned as a question that the Q and A system is likely to be asked given the corpus as an input to the Q and A system. As another example, a prior can be an area of interest expected to be addressed in the corpus. As a result a prior has a probability associated therewith—there is a probability that the question will be asked, there is a probability that the corpus will address an area of interest, etc.

Whether a corpus addresses a prior can be measured in at least two ways. One example way is by simply determining whether the prior occurs in the taxonomy of the corpus at all. If the prior occurs in the taxonomy, the corpus, the probability of the prior is 1 (or one hundred percent), other wise 0 (or zero percent). The probability of a prior can be somewhere between 0 and 1 as well. For example, if the terms of the prior appear in the taxonomy, but only at ten out of an example one hundred terminals in the taxonomy, the probability of the prior is 0.1 (or ten percent). A terminal of a taxonomy is a leaf node in a tree representation of the taxonomy. Similarly, if the prior terms appear at seventy out of the one hundred terminals, the probability of the prior in that corpus is 0.7 (or seventy percent).

Not all documents in a given corpus necessarily address a prior. Furthermore, not all documents in a given corpus address a prior more than a threshold degree. Thus, not all documents in the corpus are equally relevant, relevant at all, or relevant beyond a threshold degree, given a set of priors.

An embodiment forms initial clusters of the documents based on the taxonomic similarities between the documents. An initial cluster may very well be just a single document.

Given a set of priors, one embodiment (top pruning embodiment) identifies the documents in a given corpus that address one or more priors in the set of priors at least up to a threshold degree and forms initial clusters using those documents. One embodiment prunes the set of initial clusters according to the priors. For example, the embodiment retains those initial clusters that address a prior to at least the threshold degree, e.g., whose taxonomy gives more than a threshold probability for the prior. The embodiment discards (prunes away, does not consider further) the remaining initial clusters.

The embodiment then combines the retained initial clusters until some halting condition is reached. One example halting condition may be that after any number of steps of combining the retained initial clusters, such that no other cluster remains to be combined with a single remaining cluster. One example embodiment combines the clusters in the manner of constructing a dendrogram—by identifying similarities in the taxonomies of the clusters, and combining the clusters such that the common terms in the taxonomies of the combined clusters survive in the combined cluster's taxonomy. In the top pruning embodiment, a document can simultaneously participate in several initial clusters depending on how many priors are addressed beyond the threshold degree by the document.

Another embodiment (bottom pruning embodiment) forms initial clusters using the documents available in the cluster, e.g., by clustering documents that have some commonality in their taxonomies together into one cluster.

The embodiment then combines the retained initial clusters until some halting condition is reached. The combining of the clusters proceeds in the manner of constructing a dendrogram—by identifying similarities in the taxonomies of the clusters, and combining the clusters such that the common terms in the taxonomies of the combined clusters survive in the combined cluster's taxonomy.

Several initial clusters can be combined in several different ways to result in several different singular end clusters. One embodiment prunes the set of such different end clusters according to the priors. For example, the embodiment retains those end clusters that address a prior to at least the threshold degree, e.g., whose taxonomy gives more than a threshold probability for the prior. The embodiment discards (prunes away, does not consider further) the remaining end clusters. In the end pruning embodiment, a document participates in one initial cluster at a time, such as in the cluster whose prior the document's taxonomy addresses at a certain degree (best or otherwise). The same document can participate in different clusters in different clusters for different priors at different times.

Once an end cluster is reached, an embodiment identifies a set of keywords that best represent the end cluster, e.g., by selecting some or all of the terminals in the taxonomy of the end cluster. The set of keywords forms the epicenter of the end cluster of documents.

The epicenter is usable as a seed in data compaction for NLP. The epicenter is also usable for ranking a document in the end cluster. For example, some documents in the end cluster will be more relevant (tightly coupled) with the epicenter than others. An embodiment ranks documents in the end cluster using a proximity-type ranking where by a document closer to the epicenter (tightly coupled to the epicenter) is ranked higher than another document farther from the epicenter (not as tightly coupled to the epicenter). Generally, the tightness of the coupling, the distance from the epicenter, or other similarly purposed measurement for the ranking is a factor of how much of the taxonomy of the end cluster is from the document, and to what degree that portion of the taxonomy addresses the given set of priors.

A taxonomy (or domain topology) according to an embodiment includes one or more hierarchical tree data structures, each having a root node and several other nodes in parent-child relationships. For example, a hierarchy can start at a root node of the tree or a subtree. The nodes at the next level in the hierarchy from the root node are children nodes of the root node in that tree or subtree. The hierarchy can continue to any number of levels in a similar fashion. Some example occupants of the nodes in such tree representations according to an embodiment include but are not limited to words, keywords, phrases, numbers, alphanumeric strings, symbols, icons, speech patterns, and images.

A seed is a collection of nodes in a tree in a taxonomy. For example, an example seed according to an example embodiment includes all words and phrases corresponding to a root node and another node, including all intervening nodes in the tree. Another example seed according to an example embodiment includes the words and phrases corresponding to a combination of one or more nodes in the tree.

Seeds can be specific or generic. For example, in one embodiment, specific seeds are found towards the bottom (closer to the lowest leaf nodes) of the tree and general or generic seeds are found towards the top (closer to the root node) of the tree.

Using the statistical model, one or more linguistic models, and the taxonomy of the end cluster, a compaction embodiment produces pseudo-documents. A pseudo-document (PD) is a document not directly received from any data source, but formed using information extracted from the corpus according to an embodiment.

A compaction embodiment submits a set of pseudo-documents to an NLP engine for use in NLP. Advantageously, the size of the set of pseudo-documents is smaller than the size of the corpus, without losing the domain-specific information therefrom, thereby achieving compaction of the corpus. Advantageously, the set of pseudo-documents produced by an embodiment further improve precision, accuracy, and recall in NLP processing, as compared to NLP using the expanded data of the corpus.

The illustrative embodiments are described with respect to certain data processing systems, environments, components, and applications only as examples. Any specific manifestations of such artifacts are not intended to be limiting to the invention. Any suitable manifestation of data processing systems, environments, components, and applications can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
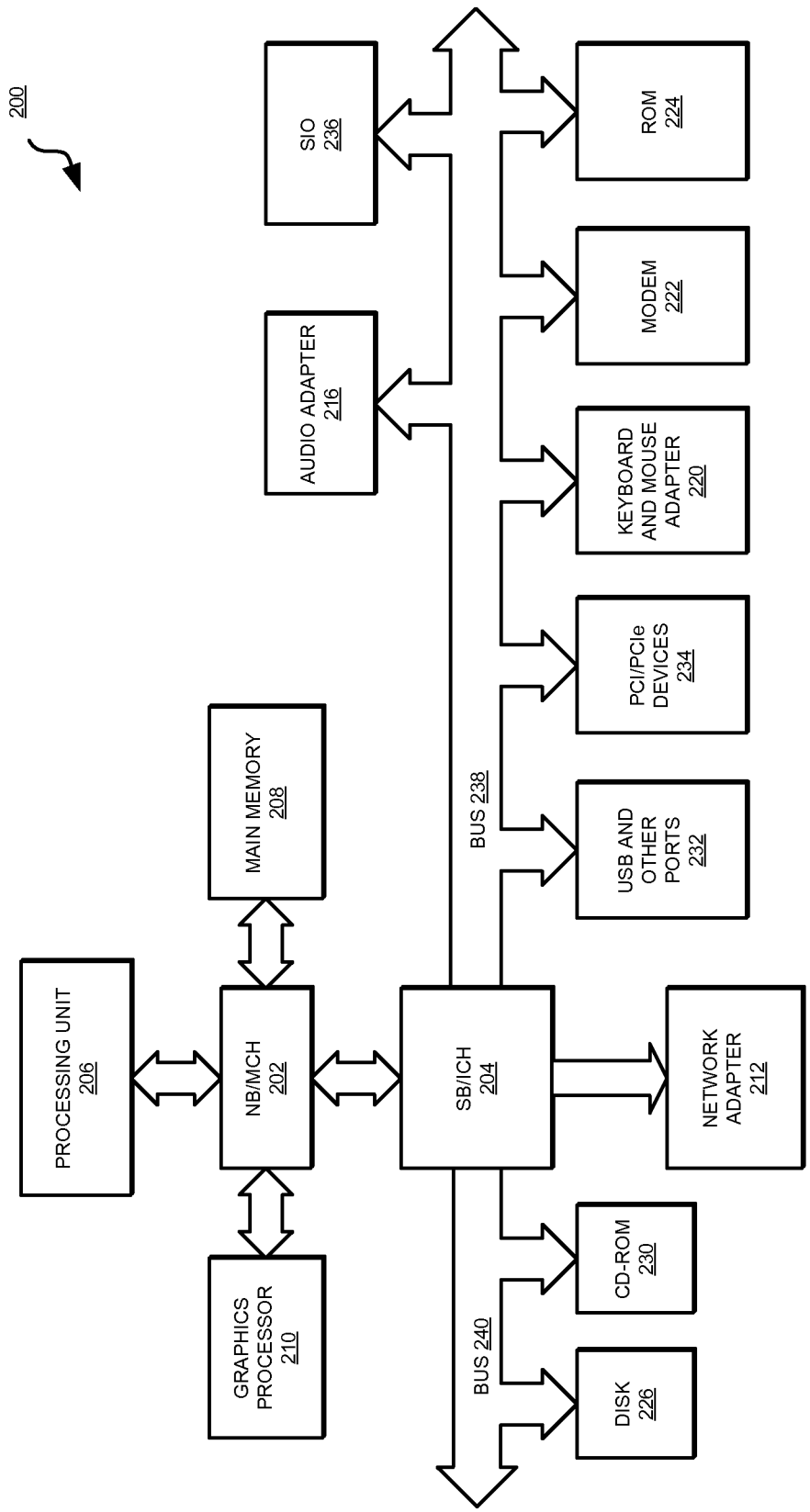
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables. Server 104 and server 106 couple to network 102 along with storage unit 108. Software applications may execute on any computer in data processing environment 100.

In addition, clients 110, 112, and 114 couple to network 102. A data processing system, such as server 104 or 106, or client 110, 112, or 114 may contain data and may have software applications or software tools executing thereon.

Only as an example, and without implying any limitation to such architecture, FIG. 1 depicts certain components that are useable in an embodiment. For example, Application 105 in server 104 implements an embodiment for seed selection in corpora compaction for natural language processing described herein. Application 131 may execute in server 104 or elsewhere, and implements a compaction embodiment. NLP engine 107 in server 106 implements a combination of tools and techniques to be used within or in conjunction with application 105 for NLP as described herein. Taxonomy 109 in storage 108 includes one or more tree structures as described herein. Data retrieval tool 115 in client 114 retrieves data from one or more data sources, such as data sources 132 and 134 over network 102. In one embodiment, data source 132 is local, for example, accessible over a bus or a local area network, and data source 134 is external, for example, accessible over a wide area network.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as server 104 or client 110 in FIG. 1, or another type of device in which computer usable program code or instructions implementing the processes may be located for the illustrative embodiments.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro- SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), or Linux® (Linux is a trademark of Linus Torvalds in the United States and other countries). An object oriented programming system, such as the Java™ programming system, may run in conjunction with the operating system and provides calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as applications 105 and 131 in FIG. 1, NLP engine 107 in FIG. 1, are located on storage devices, such as hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
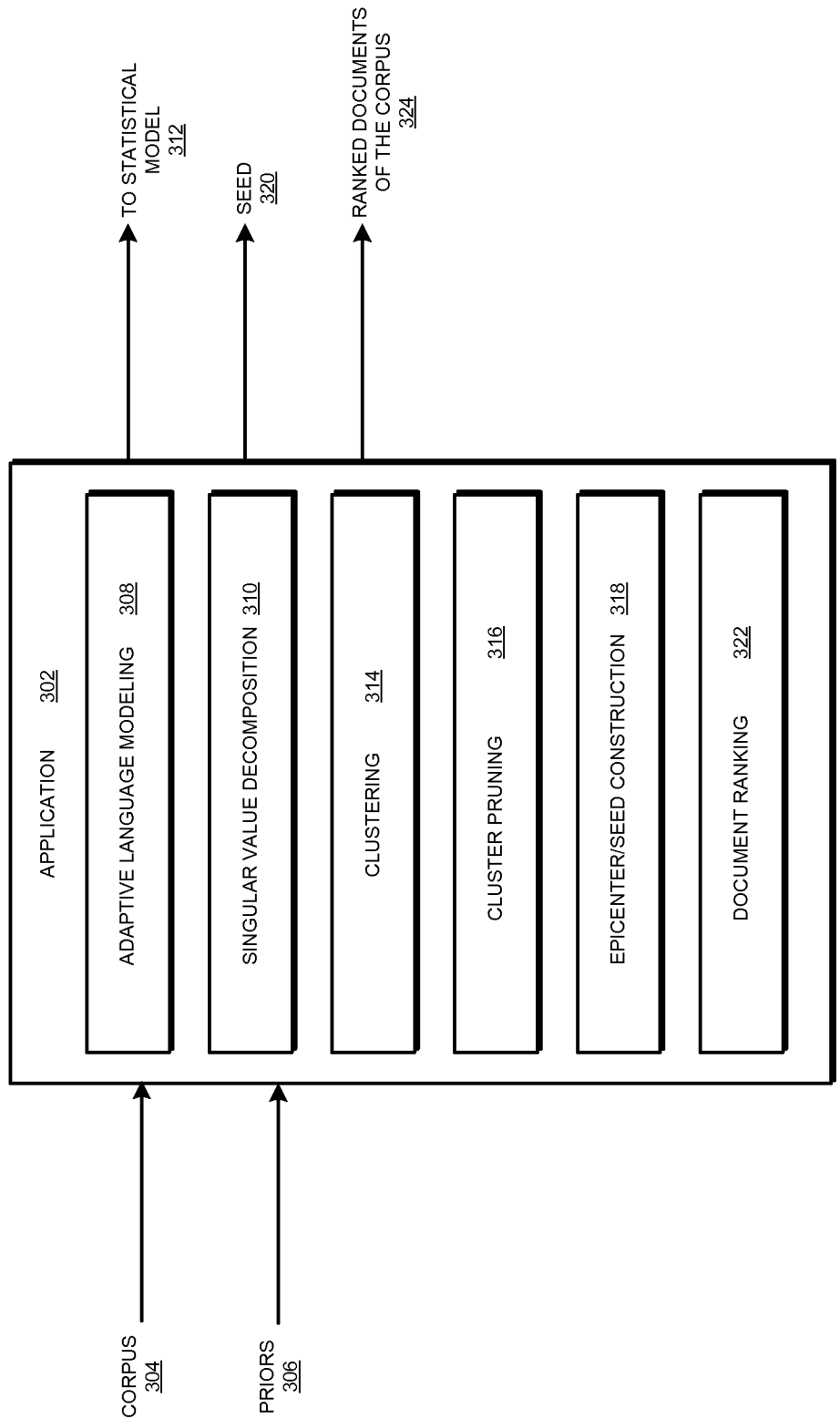
FIG. 3 depicts a block diagram of a process of seed selection in corpora compaction for natural language processing in accordance with an illustrative embodiment.

With reference to FIG. 3, this figure depicts a block diagram of a process of seed selection in corpora compaction for natural language processing in accordance with an illustrative embodiment. Application 302 is an example of application 105 in FIG. 1.

Application 302 receives corpus 304, where corpus 304 pertains to a subject matter domain. Application 302 further receives set 306 of one or more priors, as described earlier.

Adaptive language modeling component 308 constructs one or more ALMs using SVD performed by component 310, in a manner described earlier. The ALMs are used as input 312 to construct a statistical model for corpus 304.

Component 314 performs the clustering of documents. In one embodiment, clustering component 314 clusters the documents into initial clusters according to the commonalities in their taxonomies. Clustering component 314 then merges the clusters, e.g., in the manner of constructing a dendogram, to form one or more end clusters.

For example, consider initial clusters C11, C12, C13, and C14. C11 is closest to C12 based on the commonalities in their respective taxonomies as compared to the commonalities (and the corresponding distance) between the taxonomies of clusters C11 and C13 or C11 and C14. Accordingly, component 314 merges C11 with C12 forming cluster C21. C13 may be merged with C14 in a similar manner forming cluster C22. In some cases, the commonalities may not be sufficient (the distance may be greater than a threshold to warrant a merge), and C13 and C14 may remain unmerged. If the commonalities in the taxonomies of C21 and C22 warrant merger, component 314 creates cluster C31, where C31 is an end cluster. When C21 and C22 do not warrant a merger (e.g., when the commonalities are insufficient or the distance does not meet the threshold), C21 and C22 are regarded as end clusters.

Cluster pruning component 316 prunes the set of initial clusters or the set of end clusters as described earlier. For example, in one embodiment, once component 314 has constructed the initial clusters, component 316 prunes the set of initial clusters according to one or more priors in set 306 of priors. In another embodiment, component 316 prunes the set of end clusters resulting from the merger operation of component 314 according to one or more priors in set 306 of priors.

Component 318 determines the epicenter of one or more end clusters resulting from clustering, merging, and pruning operations of components 314 and 316. For example, in one embodiment component 318 collects some or all terminals of a taxonomy tree of an end cluster as keywords. A series of keywords, in any suitable order, forms the epicenter, or seed 320 for that end cluster. Application 302 outputs seed 320, such as for use in compaction application 131 in FIG. 1 (the operations of compaction application 131 are not within the scope of this disclosure and are therefore not described herein).

Component 322 ranks the documents of the one or more end clusters according to the epicenter constructed by component 318. The ranking of a document indicates how tightly coupled, relevant, important, or useful the document is for any priors that are related to the epicenter.

In one example to illustrate the coupling between a document and an epicenter and without implying any limitation thereto, consider that the epicenter includes a set of keywords, and those keywords correspond to a prior. A document that includes more than a threshold occurrences of all or some of those keywords is more tightly coupled to the epicenter of the end cluster than another document that includes fewer occurrences of all or some of those keywords.

In another example to illustrate the coupling between a document and an epicenter and without implying any limitation thereto, consider that the epicenter includes a set of weighted keywords, and those keywords correspond to a prior. A document that includes more total weight according to the occurrences of all or some of those keywords in the document is more tightly coupled to the epicenter of the end cluster than a second document that includes a lesser weight by comparison, based on the occurrences of all or some of those keywords in the second document.

Application 302 outputs ranked documents 324. The ranking is usable to advantageously compact corpus 304 for NLP. To those of ordinary skill, these non-limiting example manners of determining a relationship between the epicenter (seed) of an end cluster and a document in the end cluster will reveal in the art other manners usable for a similar purpose, and such other manners are contemplated within the scope of the illustrative embodiments.

Figure 4:
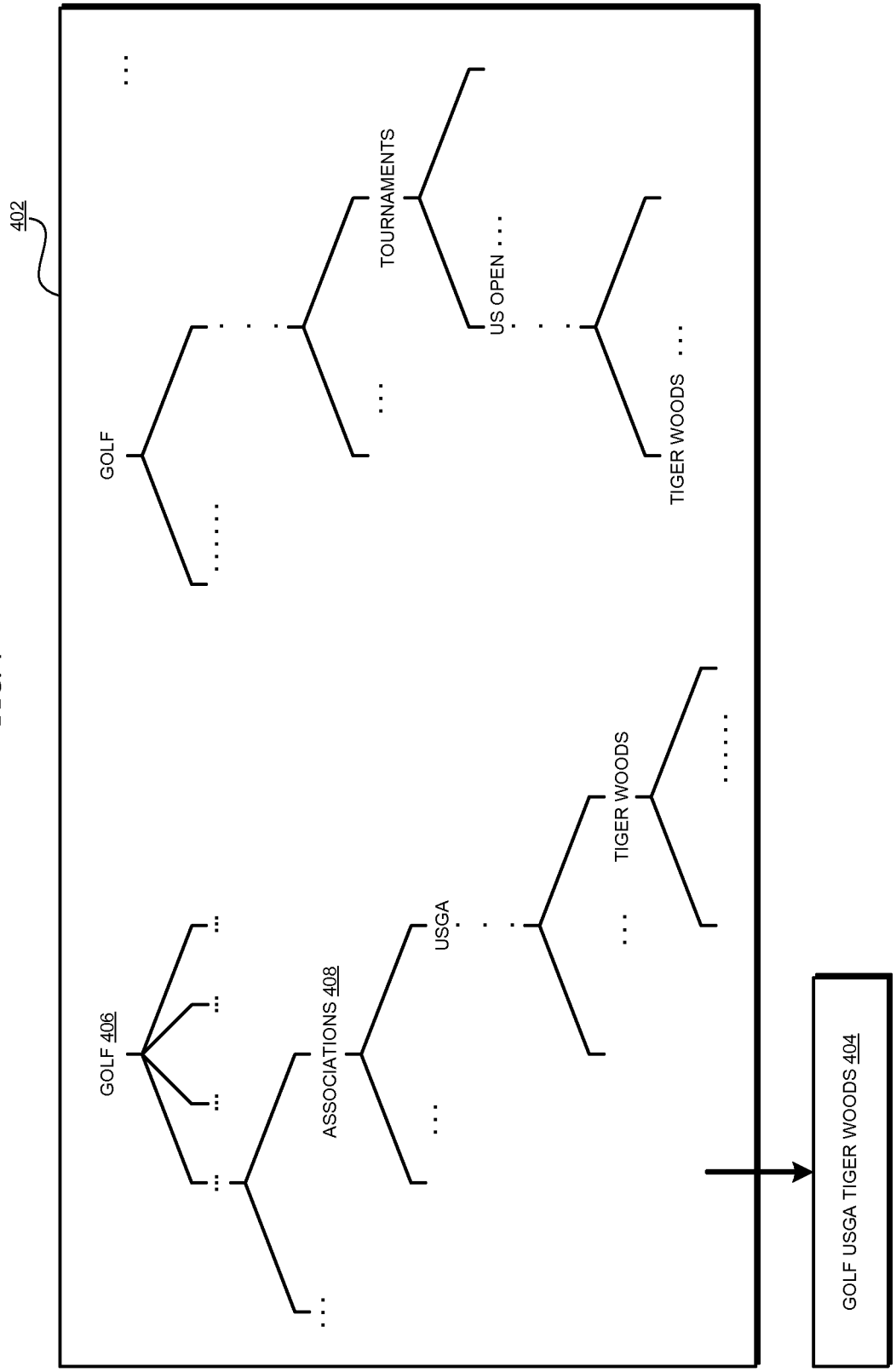
FIG. 4 depicts an example configuration of a taxonomy in accordance with an illustrative embodiment.

With reference to FIG. 4, this figure depicts an example configuration of a taxonomy in accordance with an illustrative embodiment. Seed 404 created from taxonomy 402 is one example way of representing the epicenter or seed constructed by component 318 in FIG. 3.

Taxonomy 402 includes any number of tree structures for a given document, collection of documents, or a given corpus. For example, taxonomy 402 pertains to the subject matter domain of golf. An example tree begins at root node 406 that contains the text "golf." At some level in the example tree, node 408 forms a sub-tree within which the information pertains to golfing associations. A node in the example tree is a terminal in the taxonomy. A child node of node 408 contains the acronym "USGA." (USGA is a registered trademark of United States Golf Association in the United States.) At some level under the USGA node, a set of children nodes contain the names of athletes who are associated with USGA in some manner. Node containing "Tiger Woods" is one such node. Nodes may exist below the "Tiger Woods" node and may contain specifics about that athlete.

Using the example tree, seed 404 can be created by a person or application. When seed 404 pertains to an end cluster, e.g., an end cluster resulting from the operation of component 314 in FIG. 3, the seed is the epicenter of the end cluster. In one embodiment, application 402 of FIG. 4 also includes or uses (not shown) a component for seed construction to construct seeds such as seed 404. In the depicted example, seed 404 comprises information existing at certain nodes, such as "golf usga tiger woods," as extracted from those respective nodes in the depiction. A seed can be constructed with any number and ordering of nodes from a tree in a given taxonomy in a similar manner without limitation. In one embodiment, a variant of the information existing at a node in a given tree in a given taxonomy can be used in constructing a seed within the scope of the illustrative embodiments.

Figure 5:
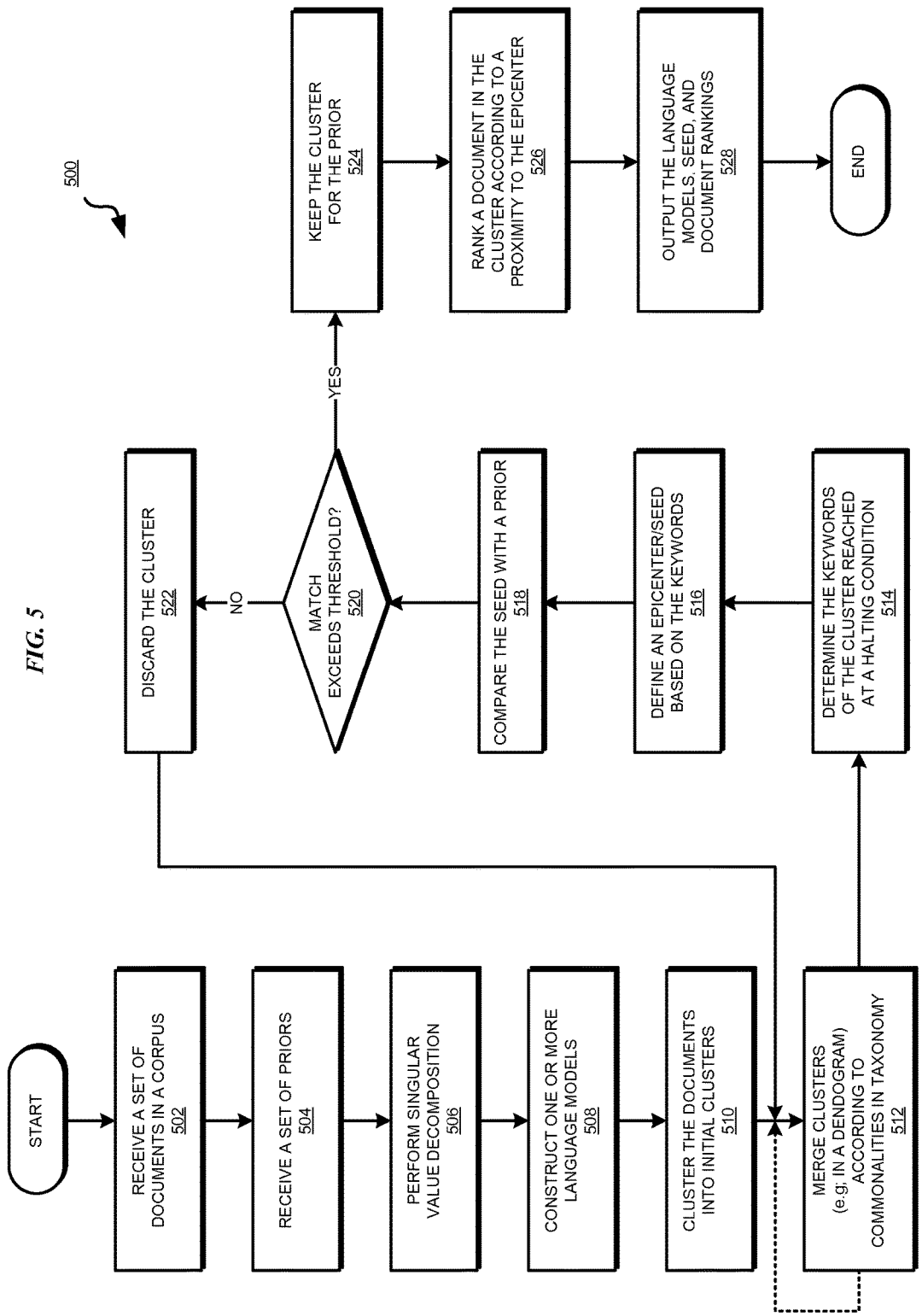
FIG. 5 depicts a flowchart of an example process for seed selection in corpora compaction for natural language processing in accordance with an illustrative embodiment.

With reference to FIG. 5, this figure depicts a flowchart of an example process for seed selection in corpora compaction for natural language processing in accordance with an illustrative embodiment. Process 500 depicts an end pruning embodiment and can be implemented in application 302 in FIG. 3.

The application receives a set of documents in a corpus (block 502). The application receives a set of priors (block 504).

The application performs SVD on one or more documents received in block 502 (block 506). The application constructs one or more language models based on the SVD (block 508).

The application clusters the documents into initial clusters, such that a subset of documents forms an initial cluster (block 510). The application merges two or more clusters into a merged cluster, such as in the manner of constructing a dendrogram, according to the commonalities in the taxonomies of the merging clusters (block 512). The application repeats block 512 to result in one or more end clusters. Not all initial clusters may participate in the merging. A merging activity of block 512 can result in more than one end clusters. Under certain circumstances, an initial cluster can also be an end cluster, such as when the initial cluster is never merged with another cluster during any operation of block 512.

The application determines the keywords that are representative of the end cluster reached at a halting condition during the merging (block 514). One example halting condition is when a singular end cluster exists at some stage in the merging process. Another example halting condition occurs when the clusters at any stage of the merging process cannot be merged further. Many other halting conditions will be apparent to those of ordinary skill in the art and the same are contemplated within the scope of the illustrative embodiments.

The application defines an epicenter or seed based on the keywords identified in block 514 (block 516). The application compares the seed with a prior received in block 504 (block 518).

The application determines whether the seed matches the prior by more than a threshold degree (block 520). For example, the application determines whether the seed and the prior have more than a threshold degree of commonalities such that the end cluster from which the seed was determined is suitable for answering a question according to the prior with greater than a threshold probability.

If the match does not exceed the threshold ("No" path of block 520), the application returns process 500 to block 512, to merge the initial clusters in a different manner, such as according to different commonalities than the ones used in the merging in the previous iteration. If the match exceeds the threshold ("Yes" path of block 520), the application keeps or saves the end cluster corresponding to the seed for addressing the prior, such as for answering questions related to the prior (block 524).

The application ranks a document in the saved end cluster according to the proximity of the document to the seed as described earlier (block 526). The application outputs the one or more language models of block 508, the seed, and the document rankings (block 528). The application ends process 500 thereafter.

Figure 6:
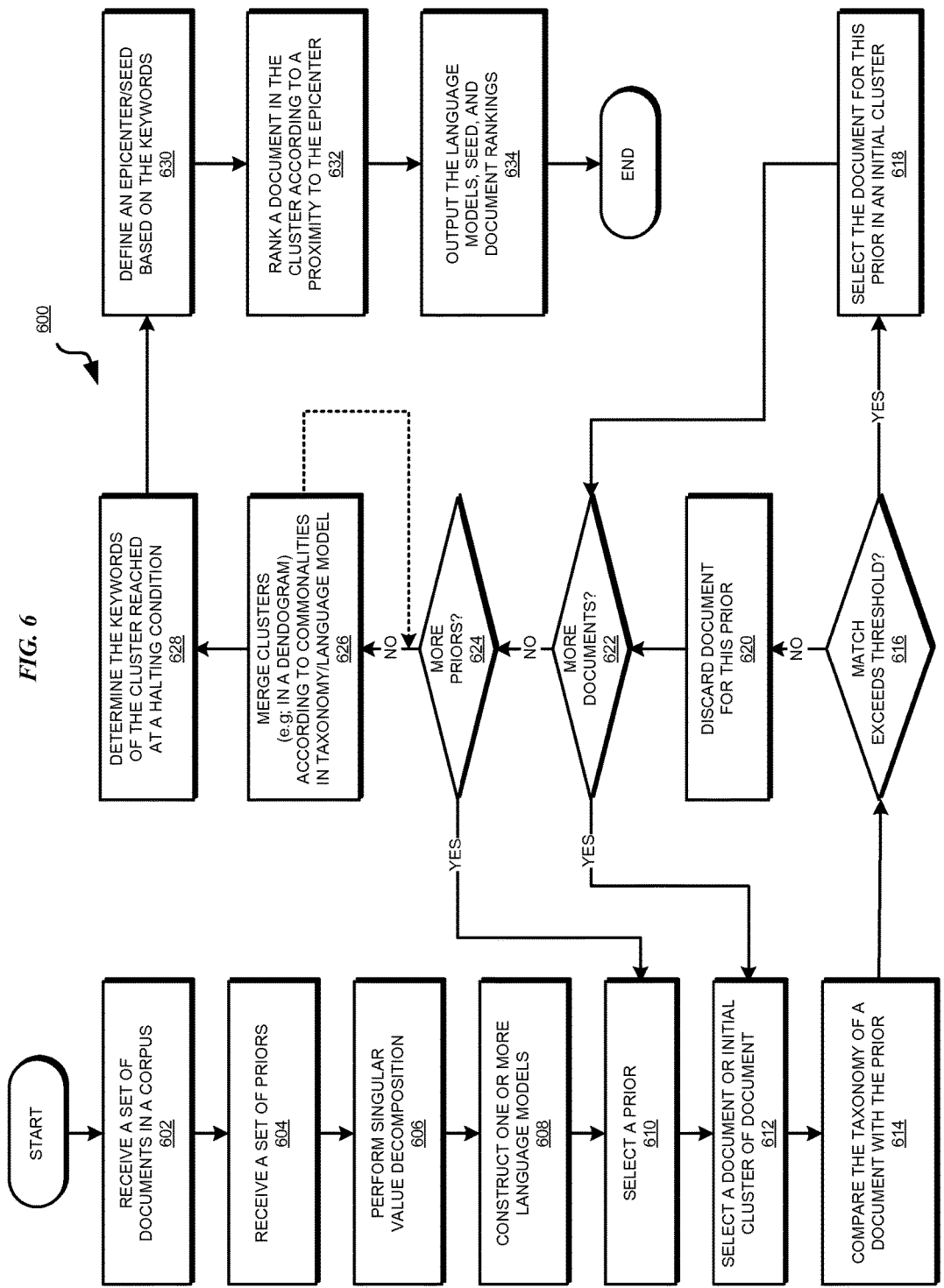
FIG. 6 depicts a flowchart of an example process for seed selection in corpora compaction for natural language processing in accordance with an illustrative embodiment.

With reference to FIG. 6, this figure depicts a flowchart of an example process for seed selection in corpora compaction for natural language processing in accordance with an illustrative embodiment. Process 600 depicts a top pruning embodiment and can be implemented in application 302 in FIG. 3.

The application receives a set of documents in a corpus (block 602). The application receives a set of priors (block 604).

The application performs SVD on one or more documents received in block 602 (block 606). The application constructs one or more language models based on the SVD (block 608).

The application selects a prior from the set of priors received in block 604 (block 610). The application selects a document from the set of documents received in block 602 (block 612). In one embodiment (not shown), the application forms initial clusters of documents, e.g., in the manner of block 510 in FIG. 5, and selects an initial cluster in block 612. The application compares the taxonomy of the selected document or initial cluster with the selected prior (block 614).

The application determines whether the taxonomy of the selected document or initial cluster matches the prior by more than a threshold degree (block 616). For example, the application determines whether a suitably chosen combination of terminals in the taxonomy and the prior have more than a threshold degree of commonalities such that the selected document is suitable for answering a question according to the prior with greater than a threshold probability.

If the match exceeds the threshold degree ("Yes" path of block 616), the application places the document in an initial cluster for the selected prior. When the application selects an initial cluster in block 612 instead of a document, the application selects the initial cluster for the selected prior in block 618. If the match does not exceed the threshold degree ("No" path of block 616), the application discards or otherwise removes from consideration for the selected prior the document or initial cluster selected in block 612 (block 620). Note that regardless of the selection of block 618 or discarding in block 620, the document or the initial cluster can still remain available for consideration with respect to another prior.

The application considers whether more documents (or initial clusters) are to be evaluated in this manner (block 622). If so, ("Yes" path of block 622), the application returns process 600 to block 612 to select another document (or initial cluster). If not, ("No" path of block 622), the application considers whether more priors are to be evaluated for pruning documents or initial clusters in this manner (block 624). If so, ("Yes" path of block 624), the application returns process 600 to block 610 to select another prior.

If not, ("No" path of block 624), the application merges two or more clusters into a merged cluster, such as in the manner of constructing a dendrogram, according to the commonalities in the taxonomies of the merging clusters (block 626). For example, in the first level of merging, the application merges the initial clusters selected in block 618, and in subsequent levels of merging, the application merges the clusters resulting from the previous level of merging. The application repeats block 626 to result in one or more end clusters.

As in process 500 in FIG. 5, not all initial clusters may participate in the merging. A merging activity of block 626 can result in more than one end clusters. Under certain circumstances, an initial cluster can also be an end cluster, such as when the initial cluster is never merged with another cluster during any operation of block 626.

The application determines the keywords that are representative of the end cluster reached at a halting condition during the merging (block 628). The application defines an epicenter or seed based on the keywords identified in block 628 (block 630).

The application ranks a document in the end cluster according to the proximity of the document to the seed (block 632). The application outputs the one or more language models of block 608, the seed, and the document rankings (block 634). The application ends process 600 thereafter.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, a computer implemented method, system, and computer program product are provided in the illustrative embodiments for seed selection in corpora compaction for natural language processing.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable storage device(s) or computer readable media having computer readable program code embodied thereon.

Any combination of one or more computer readable storage device(s) or computer readable media may be utilized. The computer readable medium may be a computer readable storage medium. A computer readable storage device may be, for example, but not limited to, an electronic, magnetic, optical, electromagnetic, or semiconductor system, apparatus, or device, or any suitable combination of the foregoing. More specific examples (a non-exhaustive list) of the computer readable storage device would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible device or medium that can store a program for use by or in connection with an instruction execution system, apparatus, or device. The term "computer readable storage device," or variations thereof, does not encompass a signal propagation media such as a copper cable, optical fiber or wireless transmission media.

Program code embodied on a computer readable storage device or computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to one or more processors of one or more general purpose computers, special purpose computers, or other programmable data processing apparatuses to produce a machine, such that the instructions, which execute via the one or more processors of the computers or other programmable data processing apparatuses, create means for implementing the functions/acts specified in the flowchart and/or block diagram block or blocks.

These computer program instructions may also be stored in one or more computer readable storage devices or computer readable media that can direct one or more computers, one or more other programmable data processing apparatuses, or one or more other devices to function in a particular manner, such that the instructions stored in the one or more computer readable storage devices or computer readable medium produce an article of manufacture including instructions which implement the function/act specified in the flowchart and/or block diagram block or blocks.

The computer program instructions may also be loaded onto one or more computers, one or more other programmable data processing apparatuses, or one or more other devices to cause a series of operational steps to be performed on the one or more computers, one or more other programmable data processing apparatuses, or one or more other devices to produce a computer implemented process such that the instructions which execute on the one or more computers, one or more other programmable data processing apparatuses, or one or more other devices provide processes for implementing the functions/acts specified in the flowchart and/or block diagram block or blocks.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A method comprising:
   forming a corpus for consumption in a human-machine language processing technology, the corpus expanding data obtained from a data source;
   forming, using a processor, a set of initial clusters from a set of documents in the corpus, wherein a subset of documents belongs to an initial cluster in the set of initial clusters, the set of documents being identified as addressing one or more priors in a given set of priors at least up to a threshold degree;
   merging a subset of the initial clusters to form a merged cluster;
   identifying a set of keywords that is representative of the merged cluster;
   forming an epicenter of the merged cluster using the set of keywords, the epicenter forming a seed to rank documents in the merged cluster;
   ranking a document that is a member of the merged cluster by determining a proximity of the document to the epicentre, the proximity being a factor of (i) an amount of a taxonomy of the merged cluster that is from the document, and (ii) a degree to which the amount of the taxonomy of the merged cluster addresses the given set of priors;
   forming a set of pseudo-documents from a set of ranked documents, wherein a pseudo-document is a document not directly received from the data source; and
   operating the human-machine language processing technology using the set of pseudo-documents as a compacted corpus, wherein the compacted corpus is smaller in size as compared to the corpus without losing domain-specific information of the data.

2. The method of claim 1, further comprising:
   pruning, according to a prior, a second set of initial clusters, wherein the second set of initial clusters includes the set of initial clusters, wherein a second initial cluster is a member of the second set of initial clusters, the second initial cluster having a corresponding second taxonomy, wherein the pruning removes the second initial cluster from consideration in the set of initial clusters because a probability that the taxonomy of the second initial cluster addresses the prior fails to exceed a threshold probability, and wherein the prior comprises a hypothesis based on a combination of knowledge, biases, and opinions.

3. The method of claim 1, further comprising:
   repeating, using different subsets of initial clusters to form a set of distinct merged clusters, the merged cluster being a member of the set of the distinct merged clusters.

4. The method of claim 3, further comprising:
pruning, according to a prior, the set of distinct merged clusters, forming a subset of distinct merged clusters, wherein the subset of distinct merged clusters includes the merged cluster and a second merged cluster, wherein a second merged cluster, the second merged cluster having a corresponding second taxonomy, wherein the pruning removes the second merged cluster from consideration in the subset of distinct merged clusters because a probability that the taxonomy of the second merged cluster addresses the prior fails to exceed a threshold probability, and wherein the prior comprises a hypothesis based on a combination of knowledge, biases, and opinions.

5. The method of claim 3, further comprising:
merging a subset of the distinct merged clusters.

6. The method of claim 1, wherein the relationship is indicative of a tight coupling of the document to the epicenter when a number of nodes in the taxonomy of the document that match a second number of keywords in the epicenter exceeds a threshold.

7. The method of claim 1, further comprising:
forming a set of weighted keywords, wherein the forming the set of weighted keywords comprises weighting a keyword in the set of keywords according to relevance of the keyword to a prior.

8. The method of claim 7, wherein the relationship is indicative of a tight coupling of the document to the epicenter when a total weight of a number of weighted keywords in the epicenter that match a second number of nodes in the taxonomy of the document exceeds a threshold.

9. The method of claim 1, further comprising:
identifying a taxonomy that represents the merged cluster, forming the merged cluster taxonomy, wherein the set of keywords is formed by selecting a subset of nodes from the merged cluster taxonomy.

10. The method of claim 1, wherein the merging comprises:
identifying a set of common nodes in a subset of taxonomies corresponding to the subset of the initial clusters; and
determining whether the set of common nodes exceeds a threshold degree of commonality between the taxonomies in the subset of taxonomies, wherein the forming the merged cluster is responsive to the set of common nodes exceeds the threshold degree of commonality.

11. The method of claim 1, wherein the merging follows a manner of constructing a dendrogram, wherein initial clusters in the subset of initial clusters are more similar to one another than initial clusters in a second subset of clusters.

12. The method of claim 1, wherein the forming the set of initial further comprises:
identifying a set of common nodes in a subset of taxonomies corresponding to the subset of documents; and
determining whether the set of common nodes exceeds a threshold degree of commonality between the taxonomies in the subset of taxonomies, wherein the forming the initial cluster is responsive to the set of common nodes exceeds the threshold degree of commonality.

13. The method of claim 1, further comprising:
performing singular value decomposition (SVD) on a document, wherein the SVD constructs a summary of the document, wherein the summary includes a count of those words in the document that relate to a prior.

14. The method of claim 13, further comprising:
constructing, using the SVD, a language model of a portion of the corpus, the portion of the corpus including the document, the language model being usable in a statistical model for compacting the corpus.

15. The method of claim 1, wherein the method is embodied in a computer program product comprising one or more computer-readable tangible storage devices and computer-readable program instructions which are stored on the one or more computer-readable tangible storage devices and executed by one or more processors.

16. The method of claim 1, wherein the method is embodied in a computer system comprising one or more processors, one or more computer-readable memories, one or more computer-readable tangible storage devices and program instructions which are stored on the one or more computer-readable tangible storage devices for execution by the one or more processors via the one or more memories and executed by the one or more processors.

17. A computer program product comprising one or more computer-readable tangible storage devices and code stored on at least one of the one or more storage devices, the code comprising:
program instructions to form a corpus for consumption in a human-machine language processing technology, the corpus expanding data obtained from a data source;
program instructions to form a set of initial clusters from a set of documents in the corpus, wherein a subset of documents belongs to an initial cluster in the set of initial clusters, the set of documents being identified as addressing one or more priors in a given set of priors at least up to a threshold degree;
program instructions to merge a subset of the initial clusters to form a merged cluster;
program instructions to identify a set of keywords that is representative of the merged cluster;
program instructions to form an epicenter of the merged cluster using the set of keywords, the epicenter forming a seed to rank documents in the merged cluster;
program instructions to rank a document that is a member of the merged cluster by determining a proximity of the document to the epicentre, the proximity being a factor of (i) an amount of a taxonomy of the merged cluster that is from the document, and (ii) a degree to which the amount of the taxonomy of the merged cluster addresses the given set of priors;
program instructions to form a set of pseudo-documents from a set of ranked documents, wherein a pseudo-document is a document not directly received from the data source; and
program instructions to operate the human-machine language processing technology using the set of pseudo-documents as a compacted corpus, wherein the compacted corpus is smaller in size as compared to the corpus without losing domain-specific information of the data.

18. The computer program product of claim 17, further comprising:
program instructions to prune, according to a prior, a second set of initial clusters, wherein the second set of initial clusters includes the set of initial clusters, wherein a second initial cluster is a member of the second set of initial clusters, the second initial cluster having a corresponding second taxonomy, wherein the pruning removes the second initial cluster from consideration in the set of initial clusters because a probability that the taxonomy of the second initial cluster addresses the prior fails to exceed a threshold probability, and wherein the prior comprises a hypothesis based on a combination of knowledge, biases, and opinions.

19. The computer program product of claim 17, further comprising:

program instructions to repeat, using different subsets of initial clusters to form a set of distinct merged clusters, the merged cluster being a member of the set of the distinct merged clusters.

20. A computer system comprising one or more processors, one or more computer-readable memories and one or more computer-readable tangible storage devices, and code stored on at least one of the one or more storage devices for execution by at least one of the one or more processors via at least one of the one or more memories, the code comprising:

program instructions to form a corpus for consumption in a human-machine language processing technology, the corpus expanding data obtained from a data source;

program instructions to form a set of initial clusters from a set of documents in the corpus, wherein a subset of documents belongs to an initial cluster in the set of initial clusters, the set of documents being identified as addressing one or more priors in a given set of priors at least up to a threshold degree;

program instructions to merge a subset of the initial clusters to form a merged cluster;

program instructions to identify a set of keywords that is representative of the merged cluster;

program instructions to form an epicenter of the merged cluster using the set of keywords, the epicenter forming a seed to rank documents in the merged cluster;

program instructions to rank a document that is a member of the merged cluster by determining a proximity of the document to the epicentre, the proximity being a factor of (i) an amount of a taxonomy of the merged cluster that is from the document, and (ii) a degree to which the amount of the taxonomy of the merged cluster addresses the given set of priors;

program instructions to form a set of pseudo-documents from a set of ranked documents, wherein a pseudo-document is a document not directly received from the data source; and program instructions to operate the human-machine language processing technology using the set of pseudo-documents as a compacted corpus, wherein the compacted corpus is smaller in size as compared to the corpus without losing domain-specific information of the data.

\* \* \* \* \*